(12) United States Patent
Rejda et al.

(10) Patent No.: US 9,792,935 B2
(45) Date of Patent: Oct. 17, 2017

(54) MAGNETIC DEVICES WITH VARIABLE OVERCOATS

(71) Applicant: SEAGATE TECHNOLOGY LLC, Cupertino, CA (US)

(72) Inventors: Edwin Frank Rejda, Bloomington, MN (US); Joseph Michael Stephan, Eden Prairie, MN (US); The Ngoc Nguyen, Lakeville, MN (US); Neil Zuckerman, Eden Prairie, MN (US); Gary J. Kunkel, Minneapolis, MN (US); Douglas H. Cole, Burnsville, MN (US); Michael A. Seigler, Eden Prairie, MN (US); Chris Rea, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 88 days.

(21) Appl. No.: 13/790,022

(22) Filed: Mar. 8, 2013

(65) Prior Publication Data

US 2014/0177405 A1 Jun. 26, 2014

Related U.S. Application Data

(60) Provisional application No. 61/740,514, filed on Dec. 21, 2012.

(51) Int. Cl.
*G11B 5/60* (2006.01)
*G11B 5/40* (2006.01)
(Continued)

(52) U.S. Cl.
CPC ............... *G11B 5/40* (2013.01); *G11B 5/102* (2013.01); *G11B 5/255* (2013.01); *G11B 5/3103* (2013.01);
(Continued)

(58) Field of Classification Search
CPC ..... G11B 5/6005; G11B 5/255; G11B 5/3136; G11B 5/314; G11B 5/72; G11B 5/82; G11B 5/8404; G11B 5/3106; G11B 5/6064; G11B 2005/0021; G11B 5/40; G11B 5/6082; G11B 5/6088; G11B 13/08; G11B 5/102; G11B 5/3146; G11B 5/65; G11B 5/8408;
(Continued)

(56) References Cited

U.S. PATENT DOCUMENTS 5,768,055 A 6/1998 Tian
5,774,303 A * 6/1998 Teng et al. ............... 360/235.2
(Continued)

FOREIGN PATENT DOCUMENTS

CN 1177169 3/1998
CN 101887730 11/2010
(Continued)

*Primary Examiner* — Dionne H Pendleton
(74) *Attorney, Agent, or Firm* — Mueting, Raasch & Gebhardt, P.A.

(57) ABSTRACT

A magnetic device including: a magnetic reader; a magnetic writer; and a variable overcoat, the variable overcoat positioned over at least the magnetic reader and writer, the variable overcoat having an overcoat layer, the overcoat layer having a substantially constant thickness and material; and at least one disparate overcoat portion, the disparate overcoat portion having a different thickness, a different material, or both, than the overcoat layer.

13 Claims, 9 Drawing Sheets

(51) Int. Cl.
*G11B 5/85* (2006.01)
*G11B 5/31* (2006.01)
*G11B 5/84* (2006.01)
*G11B 5/72* (2006.01)
*G11B 5/62* (2006.01)
*G11B 5/65* (2006.01)
*G11B 5/10* (2006.01)
*G11B 5/255* (2006.01)
*G11B 5/00* (2006.01)

(52) U.S. Cl.
CPC .......... *G11B 5/3106* (2013.01); *G11B 5/3133* (2013.01); *G11B 5/6005* (2013.01); *G11B 5/62* (2013.01); *G11B 5/65* (2013.01); *G11B 5/72* (2013.01); *G11B 5/8404* (2013.01); *G11B 5/6082* (2013.01); *G11B 2005/0021* (2013.01)

(58) Field of Classification Search
CPC .. G11B 5/85; G11B 5/581; G11B 5/54; G11B 2005/0005; G01N 15/1031; G01N 1/34; G01N 2015/1006; G01N 33/48728; C23C 14/48; Y10T 29/49032; Y10T 428/1164
USPC ....... 360/256.2, 265.9, 318.1–320, 328, 122, 360/123.06, 123.09, 123.12, 123.29, 360/123.35, 123.37, 123.5, 123.56, 360/123.58, 125.08, 125.72, 125.73, 75, 360/78.07
See application file for complete search history.

(56) References Cited

U.S. PATENT DOCUMENTS

| | | |
|---|---|---|
| 5,846,441 A | 12/1998 | Roh |
| 5,985,163 A | 11/1999 | Cha |
| 5,986,851 A | 11/1999 | Angelo |
| 6,359,754 B1 | 3/2002 | Riddering |
| 6,433,965 B1 | 8/2002 | Gopinathan |
| 7,746,597 B2 | 6/2010 | Huang |
| 8,014,104 B2 | 9/2011 | Cheng |
| 2003/0198146 A1 | 10/2003 | Rottmayer |
| 2005/0270694 A1* | 12/2005 | Umehara et al. ............. 360/126 |
| 2006/0083116 A1 | 4/2006 | Rottmayer |
| 2006/0092570 A1* | 5/2006 | Payne et al. ................ 360/236.5 |
| 2009/0185314 A1* | 7/2009 | Hachisuka .................... 360/314 |
| 2010/0202081 A1* | 8/2010 | Shimazawa et al. ........... 360/59 |
| 2010/0265618 A1* | 10/2010 | Boutaghou et al. ....... 360/234.3 |
| 2011/0222180 A1* | 9/2011 | Willis ............................ 360/31 |
| 2013/0163117 A1* | 6/2013 | Bhatia et al. ................. 360/110 |
| 2014/0241139 A1* | 8/2014 | Nishijima ........... G11B 5/3133 369/13.33 |

FOREIGN PATENT DOCUMENTS

| | | |
|---|---|---|
| JP | H08-180352 | 7/1996 |
| JP | 2007-149158 | 6/2007 |
| JP | 2008-234828 | 10/2008 |
| WO | 98/14935 | 4/1998 |

* cited by examiner

MAGNETIC DEVICES WITH VARIABLE OVERCOATS

PRIORITY

This application claims priority to U.S. Provisional Application No. 61/740,514 entitled "MAGNETIC DEVICES HAVING VARIABLE OVERCOATS ON WRITER AND READER" filed on Dec. 21, 2012, the disclosure of which is incorporated herein by reference thereto.

BACKGROUND

The heat assisted magnetic recording (HAMR) process can involve an environment that can be extremely corrosive because of the high temperature and exposure to corrosive chemistries. Furthermore, designs using close head-media spacing will experience more rapid wear of any narrow, protruded features such as write poles. Because of the harsh environment and the desire to protect some of the more delicate structures, for example the near field transducer (NFT) and the write pole for example, there remains a need for different types of overcoats.

SUMMARY

A magnetic device including: a magnetic reader; a magnetic writer; and a variable overcoat, the variable overcoat positioned over at least the magnetic reader and writer, the variable overcoat having an overcoat layer, the overcoat layer having a substantially constant thickness and material; and at least one disparate overcoat portion, the disparate overcoat portion having a different thickness, a different material, or both, than the overcoat layer.

A method includes depositing a first layer over the entire surface of a structure, the structure having a magnetic reader and a magnetic writer, wherein the magnetic reader and the magnetic writer are positioned adjacent to each other on a substrate; removing a portion of the first layer over at least the magnetic reader; and depositing a second layer over the entire surface of the first layer, wherein the first layer and the second layer make up a variable overcoat, the variable overcoat having a disparate overcoat region over the magnetic writer.

A method that includes depositing a first layer on the entire surface of a structure, the structure including a magnetic reader and a magnetic writer, wherein the magnetic reader and the magnetic writer are positioned adjacent to each other on a substrate; masking regions of the surface to form exposed and unexposed regions; depositing a second layer on the surface of the exposed and unexposed regions; and removing the unexposed regions and the second layer on the unexposed regions.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed devices can offer the advantage of providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, thermally or heat assisted magnetic recording (HAMR) heads, or disc drives that include such devices.

Figure 1:
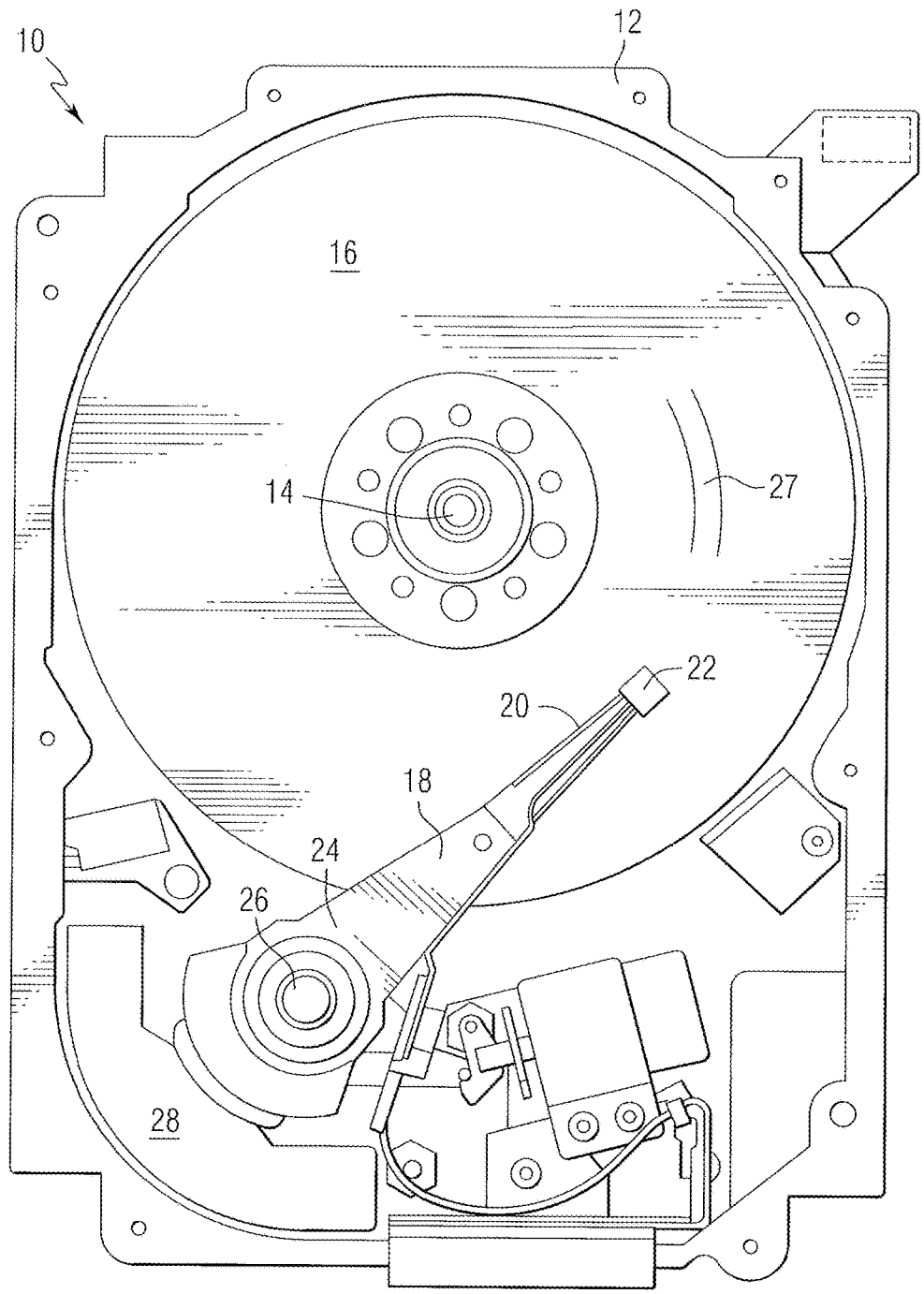
FIG. 1 is a pictorial representation of a data storage device in the form of a disc drive that can include a recording head constructed in accordance with an aspect of this disclosure.

Disclosed herein are NFTs and devices that include such NFTs. FIG. 1 is a pictorial representation of a data storage device in the form of a disc drive 10 that can utilize disclosed NFTs. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art. The storage media may include, for example, continuous media or bit patterned media.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. While FIG. 1 shows a disc drive, disclosed NFTs can be utilized in other devices that include a near field transducer.

Figure 2:
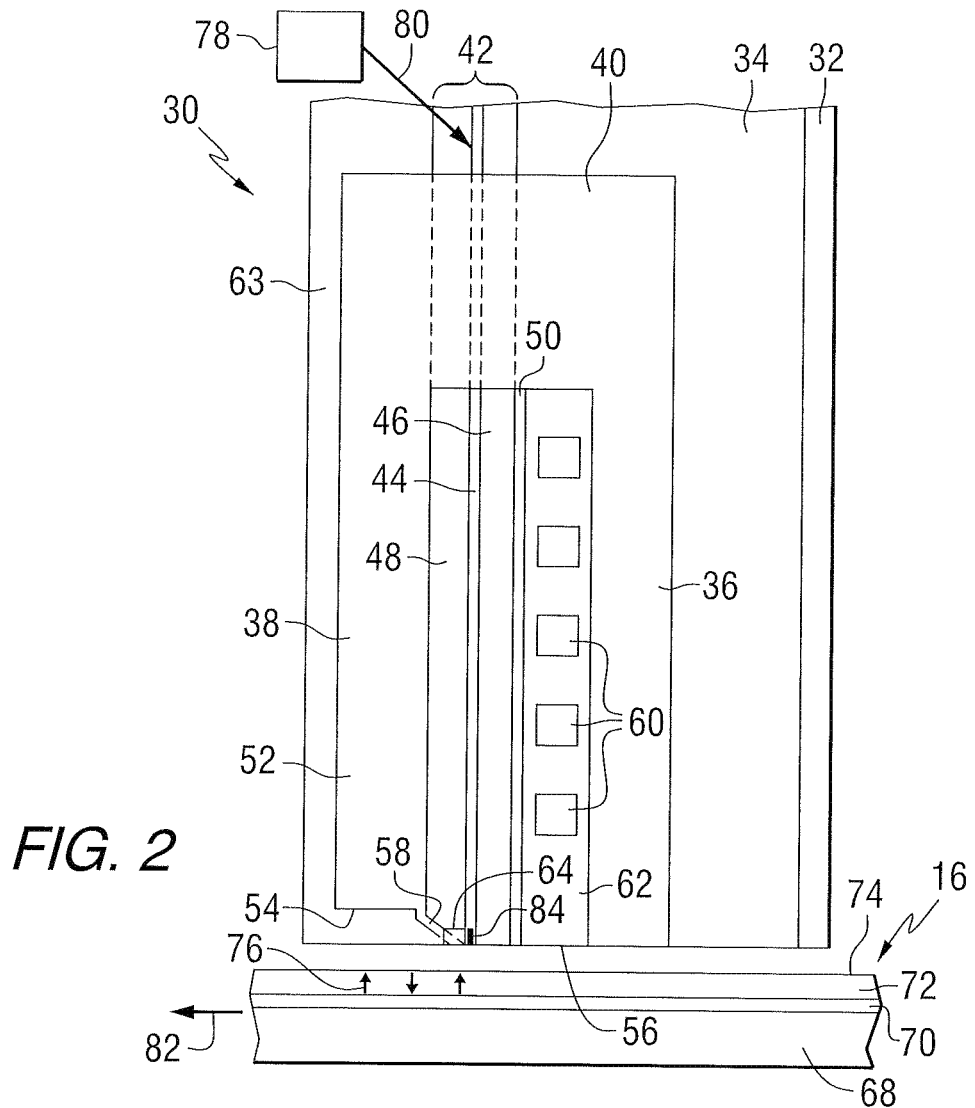
FIG. 2 is a side elevation view of a recording head constructed in accordance with an aspect of the invention.

FIG. 2 is a side elevation view of a recording head that may include a disclosed NFT; the recording head is positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, the light source can produce energy having a wavelength of 830 nm, for example. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. Energy delivered by the NFT 84 is the primary means of heating the media. A near-field transducer (NFT) 84 is positioned in or adjacent to the waveguide and at or near the air bearing surface. The design may incorporate a heat sink made of a thermally conductive material integral to, or in direct contact with, the NFT 84, and chosen such that it does not prevent coupling of electromagnetic energy into and out of the NFT 84. The heat sink may be composed of a single structure or multiple connected structures, positioned such that they can transfer heat to other metallic features in the head and/or to the gas flow external to the recording head.

Although the example of FIG. 2 shows a perpendicular magnetic recording head and a perpendicular magnetic storage media, it will be appreciated that the disclosure may also be used in conjunction with other types of recording heads and/or storage media as well. It should also be noted that disclosed devices can also be utilized with magnetic recording devices other than HAMR devices.

Figure 3:
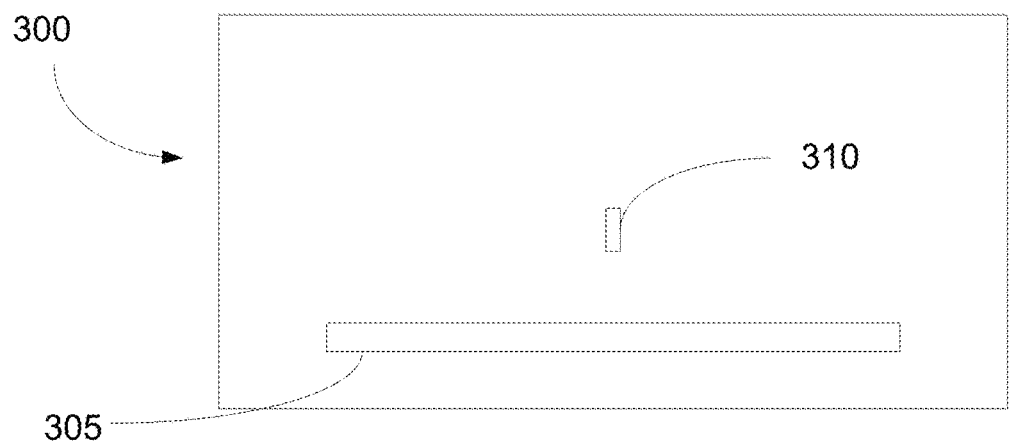
FIG. 3 is a schematic depiction of a device, looking from the air bearing surface (ABS).

FIG. 3 depicts a view looking down at the air bearing surface (ABS) of a device 300. The device 300 can include a magnetic reader 305 and a magnetic writer 310. The magnetic reader 305 and magnetic writer 310 can have details such as those discussed above. In some embodiments, the magnetic writer 310 can also include a NFT, such as those discussed above. The device also includes a variable overcoat. The variable overcoat is positioned over at least the magnetic reader and writer. In some embodiments, the variable overcoat can be positioned over more than just the magnetic reader and writer. The variable overcoat can be a continuous layer, or a non-continuous layer that is positioned over at least a portion of the device on the air bearing surface of the device. In some embodiments, variable overcoats can also include regions that are continuous as well as non-continuous regions, such variable overcoats are described herein as non-continuous.

The variable overcoat can be described as including an overcoat layer and at least one disparate overcoat portion. The overcoat layer can generally be described as having a substantially constant thickness, in some embodiments, an overcoat layer having a thickness within ±5 Å can be considered as having a substantially constant thickness. The overcoat layer can also be described as being made of substantially the same material over the entirety of the overcoat layer. Disclosed variable overcoats also generally include at least one disparate overcoat portion. A disparate overcoat portion is a portion of the variable overcoat that can have a substantially different thickness than the overcoat layer, can include a different material than the overcoat layer, or a combination thereof. A substantially different thickness is a thickness that is at least 5 Å thicker or thinner than the average thickness of the overcoat layer. The at least one disparate overcoat portion can be a discrete unconnected portion or it can be a contiguous part of the variable overcoat. Disclosed variable overcoats can include one or more than one disparate overcoat portions.

Figure 4A:
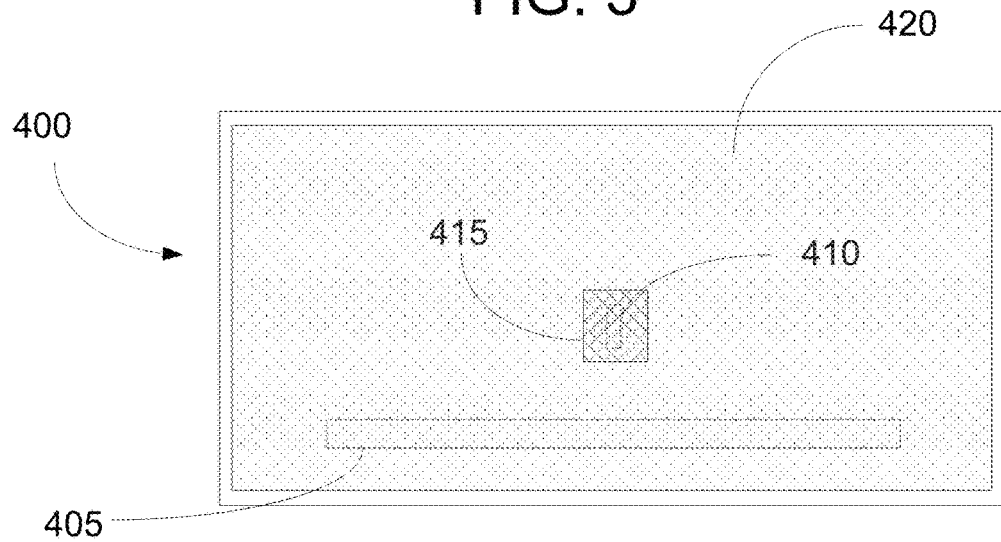
FIG. 4A is a schematic depiction of a device, looking from the air bearing surface (ABS), depicting a disparate overcoat region over the magnetic writer.

A particular disclosed embodiment of a device can include a variable overcoat that includes a disparate overcoat portion that is positioned over the magnetic writer/NFT. A schematic depiction of such a device is shown in FIG. 4A. The device 400 in FIG. 4A includes a magnetic reader 405, a magnetic writer 410, a disparate overcoat portion 415, and an overcoat layer 420. The disparate overcoat portion 415 and the overcoat layer 420 make up the variable overcoat layer. The disparate overcoat portion can include a different material than the overcoat layer, can include the same material(s) as the overcoat layer but have a different thickness, or can include at least one different material than the overcoat layer and have a different thickness.

Figure 4B:
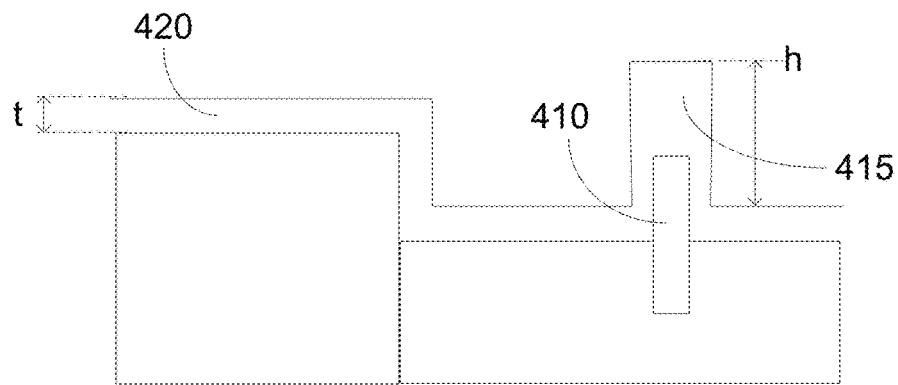
FIG. 4B is a side view of a schematic depiction of a portion of the device of FIG. 4A from a cross track direction.

FIG. 4B shows a side view of a device looking crosstrack, with the ABS at the top of the image. The device 400 includes a writer 410, which is not shown in any detail and can include a writer, and/or a NFT, and a variable overcoat layer that includes an overcoat layer 420 and at least one disparate overcoat region 415. The overcoat layer 420 can be described by an average height, or thickness, t, as shown in FIG. 4B. In some embodiments, the overcoat layer can have a thickness, t, from 5 Å to 100 Å, for example. FIG. 4B also shows the height h of the disparate overcoat region 415. The height h of the disparate overcoat region can either be characterized independently or can be characterized with respect to (or as x thicker than) the thickness t of the overcoat layer. Particular heights, h, of the disparate overcoat region can be chosen based on a number of different factors. In some embodiments, disparate overcoat regions such as those depicted in FIGS. 4A and 4B can have heights from 5 Å to 60 Å, for example.

Such embodiments can be useful in HAMR devices. The HAMR recording process can involve an environment that can be extremely corrosive due to high temperature and exposure to corrosive chemistries. Typically, diamond like carbon (DLC) has been used to protect the write pole material from corrosion. The DLC can also protect features from erosion due to mechanical wear. Instances have been seen in which the DLC has been unable to completely mitigate write pole corrosion. In addition, localized thermal protrusion during the HAMR recording process can subject the writer region to significant burnishing, which in turn can remove a protective head overcoat and accelerate the corrosion process. The aggressive HAMR environment can also lead to DLC failure over the NFT device which can allow migration of the NFT material and eventual device failure. A disparate overcoat portion over the magnetic writer/NFT can function to improve thermal, chemical, and mechanical reliability in the local writer and NFT region. Such a disparate overcoat portion may also be advantageous because it does not increase the thickness of the overcoat over the reader, which increases the head to media spacing (HMS) resulting in a significant performance penalty.

In some embodiments having a disparate overcoat portion over the writer/NFT, the disparate overcoat portion can have a greater thickness than the overcoat layer. In some embodiments, the disparate overcoat portion can be about twice as thick than the overcoat layer. In some embodiments, the disparate overcoat portion can have a thickness from 30 Å to 70 Å; and the overcoat layer can have a thickness from 5 Å to 45 Å. In some embodiments, the disparate overcoat portion can have a thickness from 40 Å to 60 Å; and the overcoat layer can have a thickness from 15 Å to 35 Å. In some embodiments, the disparate overcoat portion can have a thickness of 50 Å; and the overcoat layer can a thickness of 25 Å.

In some embodiments having a disparate overcoat portion over the writer/NFT, the disparate overcoat portion can include a different material than the overcoat layer. In some embodiments, the disparate overcoat portion and the overcoat layer can include the same material, but one of them also includes a different material. Different materials can be distributed throughout the entire thickness of the disparate overcoat portion (or overcoat layer) or can be in a different layer of the disparate overcoat portion (or overcoat layer). In some embodiments, both the disparate overcoat portion and the overcoat layer can include diamond like carbon (DLC) and one of them can also include an additional material. In some embodiments, both the disparate overcoat portion and the overcoat layer can include diamond like carbon (DLC) and the disparate overcoat portion can also include a second material. In some embodiments, both the disparate overcoat portion and the overcoat layer can include diamond like carbon (DLC) and the disparate overcoat portion can also include oxides, nitrides, carbides, or borides of Tantalum, Titanium, Magnesium, Nickel, Chromium, Beryllium, Zirconium, Silicon, or similar materials. In some embodiments, the disparate overcoat portion can include TaOx.

Such embodiments, where a disparate overcoat region is located over the writer, can be fabricated essentially by patterning the writer region (in some embodiments, the writer/NFT region) such that the writer region can be accessed while the reader and the remainder of the ABS are protected. Generally, various combinations of photolithographic and deposition techniques can be utilized. Specific examples of process flow are demonstrated below in discussion of methods disclosed herein.

In some embodiments having a disparate overcoat portion over the writer/NFT, the disparate overcoat portion can have a greater thickness than the overcoat layer. In some embodiments, the disparate overcoat portion can be about twice as thick than the overcoat layer. In some embodiments, the disparate overcoat portion can have a thickness from 30 Å to 70 Å; and the overcoat layer can have a thickness from 5 Å to 45 Å. In some embodiments, the disparate overcoat portion can have a thickness from 40 Å to 60 Å; and the overcoat layer can have a thickness from 15 Å to 35 Å. In some embodiments, the disparate overcoat portion can have a thickness of 50 Å; and the overcoat layer can a thickness of 25 Å.

In some embodiments having a disparate overcoat portion over the writer/NFT, the disparate overcoat portion can include a different material than the overcoat layer. In some embodiments, the disparate overcoat portion and the overcoat layer can include the same material, but one of them also includes a different material. Different materials can be distributed throughout the entire thickness of the disparate overcoat portion (or overcoat layer) or can be in a different layer of the disparate overcoat portion (or overcoat layer). In some embodiments, both the disparate overcoat portion and the overcoat layer can include diamond like carbon (DLC) and one of them can also include an additional material. In some embodiments, both the disparate overcoat portion and the overcoat layer can include diamond like carbon (DLC) and the disparate overcoat portion can also include a second material. In some embodiments, both the disparate overcoat portion and the overcoat layer can include diamond like carbon (DLC) and the disparate overcoat portion can also include oxides, nitrides, carbides, or borides of Tantalum, Titanium, Magnesium, Nickel, Chromium, Beryllium, Zirconium, Silicon, or similar materials. In some embodiments, the disparate overcoat portion can include TaOx.

Figure 5A:
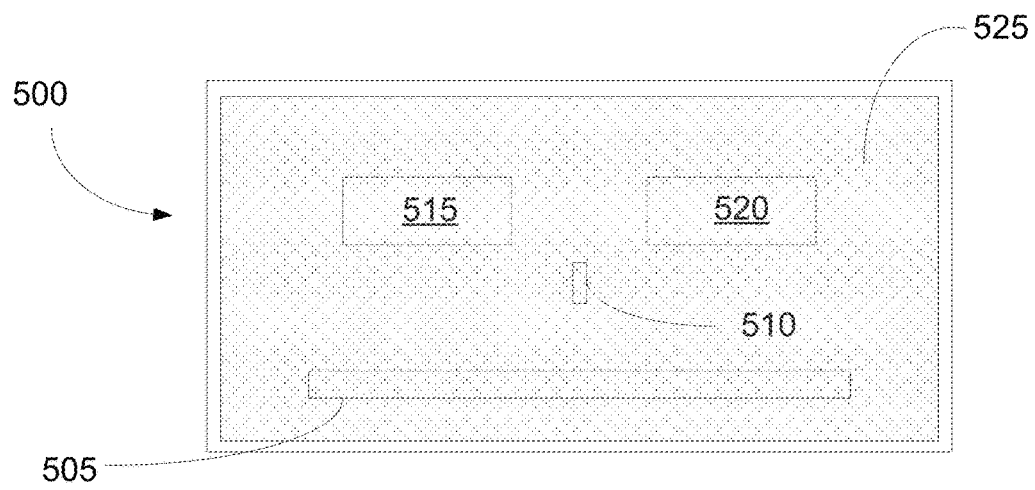
FIG. 5A is a schematic depiction of a device, looking from the air bearing surface (ABS), depicting two disparate overcoat regions.

In some embodiments, the at least one disparate overcoat portion can be located away from both the reader and the writer. FIG. 5A shows a schematic of an example of such an embodiment. The device 500 includes a reader 505, a writer, 510 and a variable overcoat made up of an overcoat layer 525 and two disparate overcoat regions 515 and 520. As seen in FIG. 5A, neither of the disparate overcoat regions are located over the writer or the reader. The disparate overcoat regions 510 and 520 in this device can be described as being located on either side, in a downtrack direction, of the magnetic writer.

Figure 5B:
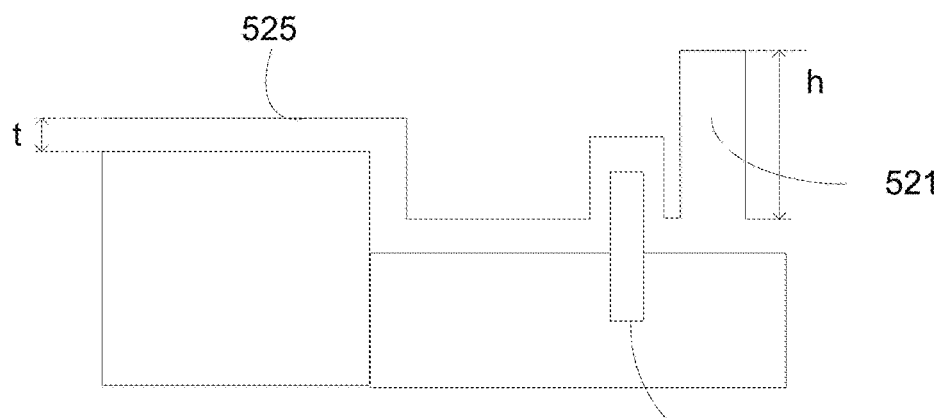
FIG. 5B is a side view of a schematic depiction of a portion of the device of FIG. 5A from a cross track direction.

FIG. 5B shows a side view of a device looking crosstrack, with the ABS at the top of the image. The device 500 includes a transducer 508, which is not shown in any detail and can include a reader, a writer, and/or a NFT, and a variable overcoat layer that includes an overcoat layer 525 and at least one disparate overcoat region 521. The overcoat layer 525 can be described by an average height, or thickness, t, as shown in FIG. 5B. In some embodiments, the overcoat layer can have a thickness, t, from 5 Å to 100 Å, for example. It should be noted that the at least one disparate overcoat region 521 actually hides the second disparate overcoat region, which is located behind the one seen, in the crosstrack direction. FIG. 5B also shows the height h of the disparate overcoat region. The height h of the disparate overcoat region can either be characterized independently or can be characterized with respect to (or as x thicker than) the thickness t of the overcoat layer. Particular heights, h, of the disparate overcoat region can be chosen based on a number of different factors. In some embodiments, disparate overcoat regions such as those depicted in FIGS. 5A and 5B can have heights from 5 Å to 80 Å, for example.

Disparate overcoat regions such as these can function like landing pads or bumper-like surfaces. Landing pads function to contact the disc as the recording head is actuated. The landing pads can contact the disc surface at or before the transducer elements (reader, writer, NFT, etc.) come into contact with the disc surface. Alternatively or additionally, they can function to prevent the reader, writer, or NFT from contacting the disc surface at all. The landing pads can therefore bear the frictional load, increase the total contact area, reduce the wear rate, contribute to the production of the contact detection signal, or some combination thereof.

Disparate overcoat regions located away from both the reader and the writer may also have other additional or optional functions. They can have shapes or profiles chosen or designed to control the travel of lubricants and/or contaminant particles in the transducer region. They can be arranged to alter local pressurization, thereby changing the cooling of the surface which could enhance local heater efficiency. They can share the load, upon contact, along with other features on the ABS. They can have wear, due to contact, spread to them in order to minimize wear of more delicate features.

Exemplary designs of the disparate overcoat regions can include that depicted in FIG. 5A, regions placed lateral to the head centerline and/or lateral to transducer features, uptrack or downtrack regions (which can be similarly shaped and designed to formerly utilized contact pads, which were part of the wafer itself), or patterned regions that surround the NFT with a ring or box shape. In some embodiments, the disparate overcoat regions can be located relatively close to regions or features that are to be protected by the disparate overcoat regions. In some embodiments, the disparate overcoat regions can be located as close to the features that are to be protected as processing will allow. In some embodiments, the disparate overcoat regions can be located and designed (shape and dimensions) so that protrusion of the ABS, by the heat of operation, is taken into consideration. In some embodiments, the disparate overcoat regions can be located and designed so the ultimate shape and dimensions are obtained after the head is burnished.

In some embodiments, various portions of the variable overcoat layer can include various materials. For example, one or more portions of the variable overcoat layer can include materials that are chosen because of their protective properties (such as wear resistance and corrosion resistance for example), materials that are chosen because of their adhesion promoting properties, materials that are chosen because of their optical properties materials. In some embodiments, materials that may function as dielectric materials that can provided combined optical performance and wear resistance may also be utilized. Exemplary materials that may have protective properties can include diamond like carbon (DLC). Exemplary materials that may have adhesion promoting properties can include tantalum (Ta), titanium (Ti), chromium (Cr), zirconium (Zr), oxides or nitrides thereof, or combinations thereof.

Disclosed devices can be fabricated using various techniques. For example, various combinations of photolithographic and deposition techniques can be utilized. A method (or methods) that may be chosen to fabricate a device can depend on the difference between the overcoat layer and the disparate overcoat portion, the location of the disparate overcoat portion(s), the material(s) of the overcoat layer and the disparate overcoat portion, various other considerations not considered herein, or combinations thereof.

Exemplary embodiments of disclosed methods can include, for example steps of depositing a first layer on at least a portion of the surface of the substrate; masking at least one region of the surface to form a patterned exposed region; depositing a second layer onto the surface, and removing the mask and second layer, except over the exposed regions. FIGS. 6A through 6D depict an exemplary schematic of a device undergoing such a method. It should be noted that FIGS. 6A to 6D show a substrate 601. The substrate 601 can include devices and structures formed therein and thereon, for example the substrate can include a magnetic reader, a magnetic writer, a NFT, or combinations thereof.

Figure 6A:
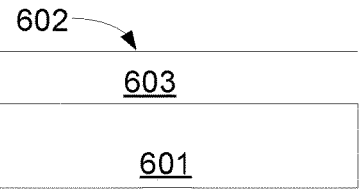
FIGS. 6A to 6E depict cross sections of articles at various stages of completion for a disclosed method.

FIG. 6A depicts an article 602 that includes a substrate 601 with a first layer 603 deposited thereon. The first layer 603 can be deposited using various methods, including for example sputter deposition, plasma vapor deposition (PVD), chemical vapor deposition (CVD), and evaporative methods. The first layer 603 can include various materials. In some embodiments, the first layer 603 can be a material that can function to protect structures or layers underneath it. As such, the first layer 603 can include, for example diamond like carbon (DLC), TaOx, CSiN. In some embodiments, the first layer 603 can include DLC.

Figure 6B:
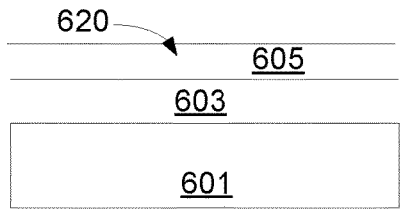

FIG. 6B depicts an article 620 after deposition of a mask layer 605. The mask layer 605 can be deposited over the entire surface of the first layer 603 or can be deposited over some portion of the first layer 603. The mask layer 605 can include various materials. In some embodiments, the mask layer 605 can be a material that can be patterned to form voids to ultimately provide various desired structures. As such, the mask layer 605 can include photoresist, and alumina, for example. In some embodiments, the mask layer 605 can include photoresist.

Figure 6C:
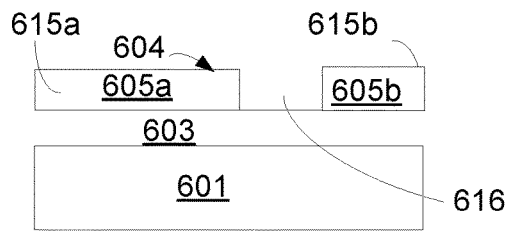

FIG. 6C depicts an article 604, after the next step: exposing at least one region of the surface of the mask layer 605 to form masked portion(s) and exposed portion(s). The steps depicted in FIGS. 6B and 6C are one method of undertaking a step of "masking regions of the surface to form at least one exposed region". The article 604 includes masked portions 605a and 605b formed on the surface of the first layer 603. After exposure, the masked portions 605a and 605b in the exemplary article, form unexposed regions 615a and 615b and exposed region 616. Multiple optional mask regions can form any desired pattern or shape on the surface of the first layer 603. The masked portions 605a and 605b can be formed using, for example, photolithography techniques. The masked portions 605a and 605b can be formed using various photolithographic techniques.

Figure 6D:
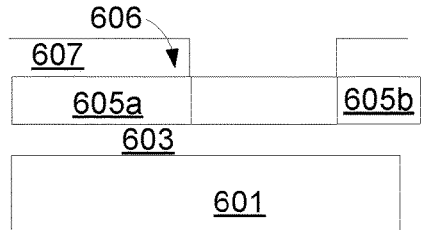

FIG. 6D shows an article 606 after the next step, depositing a second layer onto the surface. The article 606 includes a second layer 607 formed on the surface of the article. In some embodiments, the second layer 607 can be formed over the entire surface of the article. The second layer 607 can be deposited using various methods, including for example sputter deposition, plasma vapor deposition (PVD), chemical vapor deposition (CVD and evaporative methods. The second layer 607 can include various materials. In some embodiments, the second layer 607 can be chosen based on the protective properties of the material. As such, the second layer 607 can include, for example, diamond like carbon (DLC), TaOx, CSiN. In some embodiments, the second layer 607 can include DLC.

Figure 6E:
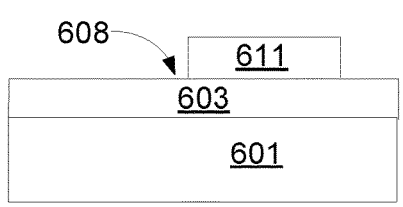

FIG. 6E shows an article 608 after the next step, removal of an unexposed portion and a second layer formed thereon, or stated another way, removal of the mask and second layer, except at the exposed regions. This removal step can be accomplished using resist lift off techniques for example. After this step, the article 608 includes a substrate 601 having a first layer 603 thereon, which also has a second layer 611 formed on a portion thereof. The bilayer structure of the portion of the first layer 609 and the portion of the second layer 611 can form a disparate overcoat region. The remainder of the first layer 603 can form the overcoat layer of a variable overcoat.

Figure 7A:
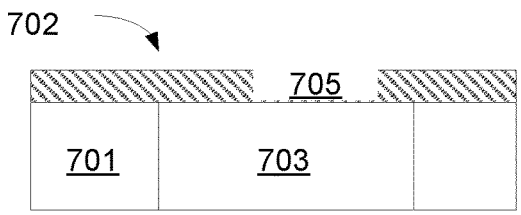
FIGS. 7A to 7D depict cross sections of articles at various stages of completion for a disclosed method.
Figure 7B:
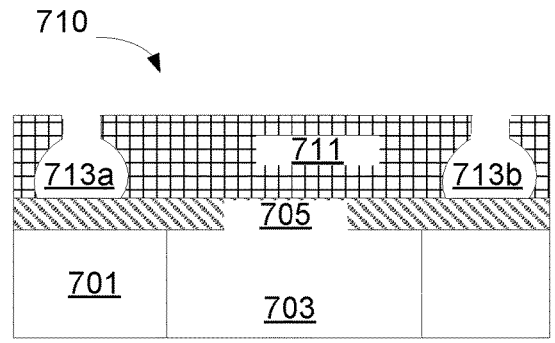
Figure 7C:
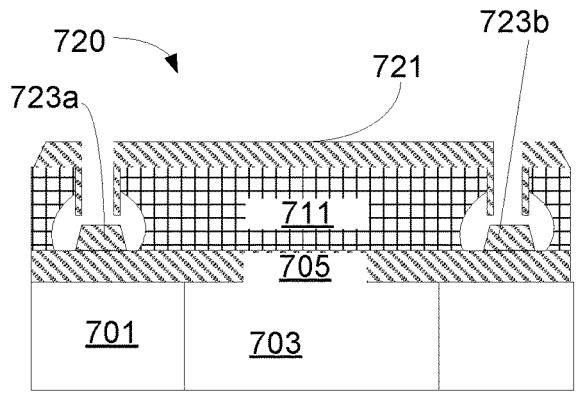
Figure 7D:
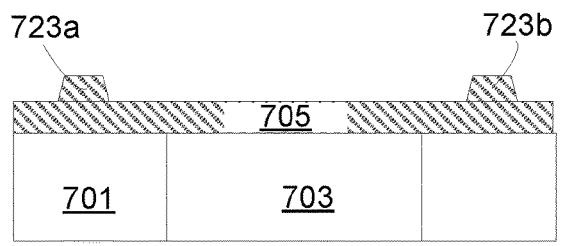

FIGS. 7A to 7D show articles at various stages of a more specific method such as that depicted in FIGS. 6A to 6E. The article 702 in FIG. 7A begins with a substrate 701 having a transducer 703, which could include a reader, writer, NFT, or some combination thereof. Deposited on the surface of this is a first layer 705. The first layer 705 can include a material that can provide protective properties, for example the first layer 705 could include DLC. Next, regions are masked and exposed to create unexposed and exposed regions. An article after completion of this step is depicted in FIG. 7B. The article 710 includes the components noted in FIG. 7A and a patterned mask layer that includes exposed regions 713a and 713b and unexposed regions 711. This step can be accomplished using various photolithographic processes which may themselves be multistep processes. Next, a second layer is deposited over the entire surface. An article after completion of this step is depicted in FIG. 7C. The article 720 includes the components noted in FIGS. 7A and 7B as well as a second layer 721 on the unexposed regions 711 and second layer deposits 723a and 723b which are generally positioned in the exposed regions 713a and 713b. There may also be second layer material that exists on the edges of the second layer 721 on the sides of the exposed region 713a and 713b voids. The second layer 721 and second layer deposits 723a and 723b are generally the same material and can be deposited all in one step. In some embodiments, the second layer 721 can be deposited to a thickness of 20 Å to 120 Å. In some embodiments, the second layer 721 can be deposited to a thickness of 40 Å to 100 Å. In some embodiments, the second layer 721 can be deposited to a thickness of 60 Å. The material can include a material that can provide protective properties, for example DLC. FIG. 7D shows an article after the next step, removal of the patterned mask layer and portion of the second layer. As seen in FIG. 7D, the only portion of the second layer that remains are the second layer deposits 723a and 723b. This step can be accomplished using a single or multiple step process and can include various resist lift off techniques.

Figure 8A:
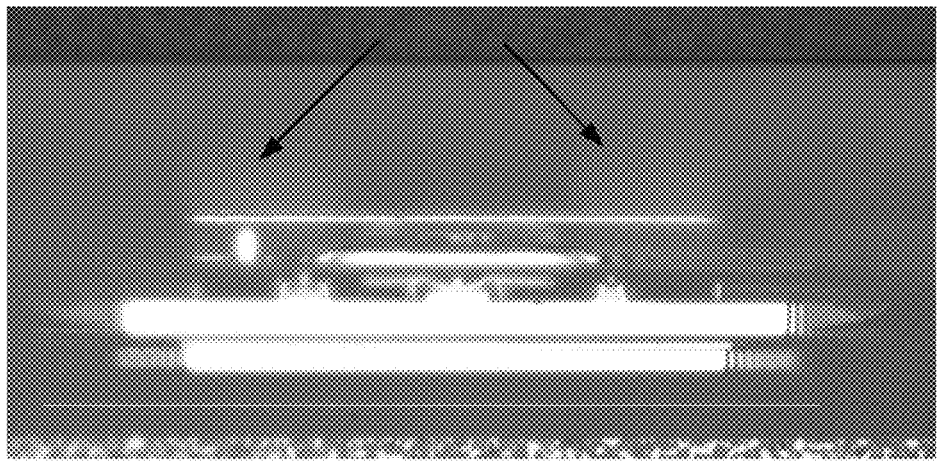
FIGS. 8A, 8B, and 8C show optical microscopic images of devices having disclosed disparate overcoat regions.
Figure 8B:
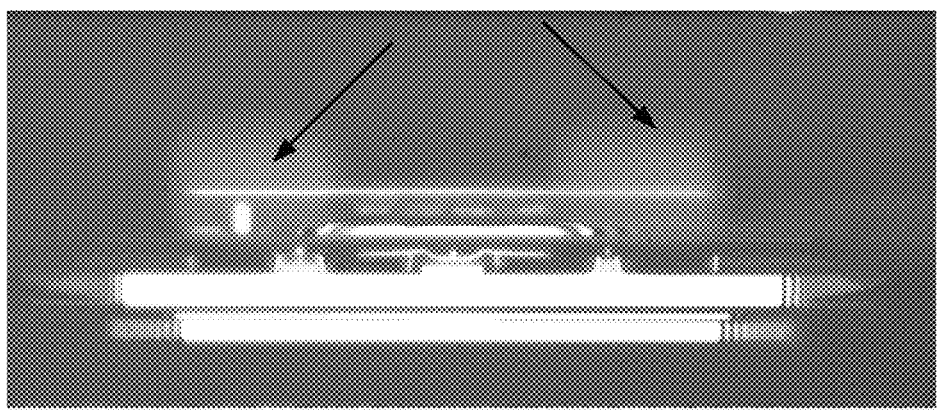
Figure 8C:
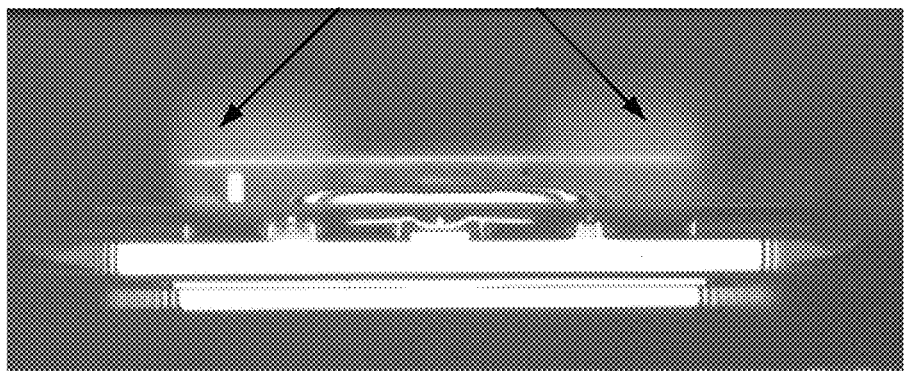

FIGS. 8A, 8B, and 8C show optical microscopic images of devices built with variable overcoats that include disparate overcoat regions having thicknesses of 40 Å (FIG. 8A), 60 Å (FIG. 8B), and 80 Å (FIG. 8C). The disparate overcoat regions are shown by the arrows in each of the images. These disparate overcoat regions were made using a method such as that depicted in FIGS. 7A to 7D.

The above disclosed method can be utilized to make various types of variable overcoats. In some embodiments, the above disclosed methods can be utilized to make variable overcoats having at least one disparate overcoat region positioned away from both the magnetic reader and magnetic writer. However, it should be noted that the specific methods as well as concepts therein can be utilized in making variable overcoats having at least one disparate overcoat region located over the magnetic writer.

In some embodiments, variable overcoats having at least one disparate overcoat region located over the magnetic writer can be made using various methods. Methods of producing such devices can be simplistically classified as either producing different voids over the different areas or filling them or as forming layers and etching differently. Both concepts can be accomplished in various ways by using a combination of photolithographic techniques.

Figure 9A:
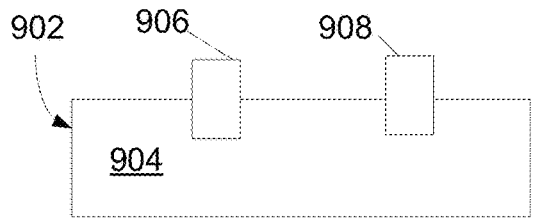
FIGS. 9A to 9D depict cross sections of articles at various stages of completion for a disclosed method.
Figure 9B:
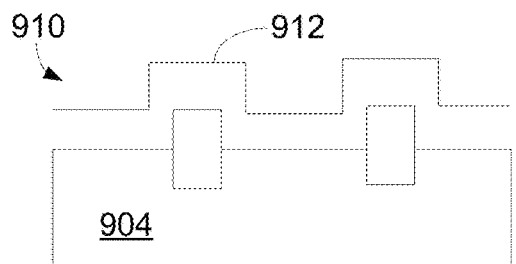
Figure 9C:
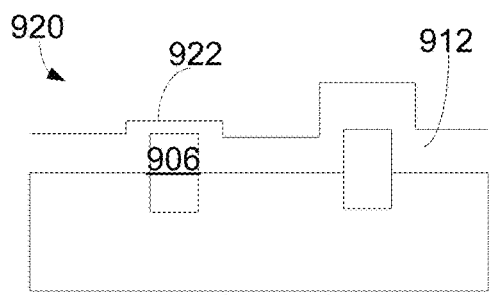
Figure 9D:
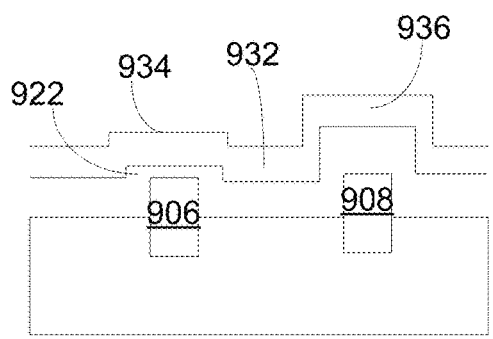

One exemplary method includes forming or obtaining a structure, the structure having a magnetic reader and a magnetic writer, wherein the magnetic reader and the magnetic writer are positioned adjacent to each other on a substrate. Such an article is depicted in FIG. 9A. The article 902 includes a substrate 904 having a magnetic reader 906 and a magnetic writer 908 positioned thereon or therein. The article 910 after the next step, depositing a first layer over the entire surface of the structure is depicted in FIG. 9B. The article 910 includes the components noted above in FIG. 9A and a first layer 912. The first layer 912 can include a material that can provide protective properties, for example DLC. Alternatively, the first layer 912 can include a material that is designed to increase the adhesion of later deposited layers. In some such embodiments, the first layer can include TaOx. In some such embodiments, the first layer can have a thickness of 35 Å and 25 Å of it can later be removed (in the next step). In other embodiments, the first layer can have a thickness of 60 Å and 50 Å of it can later be removed (in the next step). The article 920 after the next step, removing a portion of the first layer over the magnetic reader is shown in FIG. 9C. The article 920 includes the components noted above as well as a modified portion of the first layer 922. The modified portion of the first layer 922 is positioned at least over the magnetic reader 906. This step can be accomplished using various mask and etch steps including for example photolithographic techniques. The article 930 after the next step, depositing a second layer over the entire surface of the first layer is depicted in FIG. 9D. The article 930 includes the components noted above as well as a second layer 932. The second layer 932 can include a material that can provide protective properties, for example DLC. The second layer 932 forms a disparate overcoat region 936 positioned over the magnetic writer 908. The remainder of the second layer 932 forms an overcoat layer 934 that is thinner than the variable overcoat region 936.

Figure 10A:
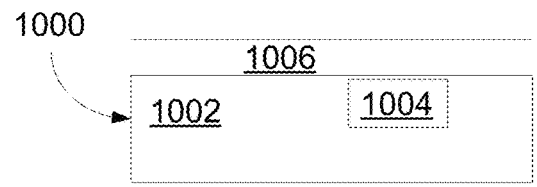
FIGS. 10A to 10D depict cross sections of articles at various stages of completion for a disclosed method.
Figure 10B:
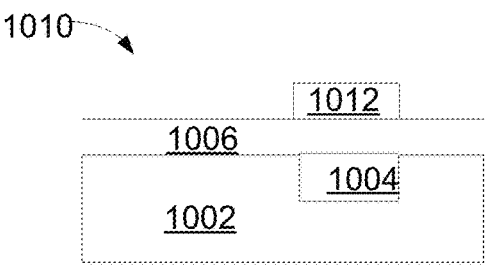
Figure 10C:
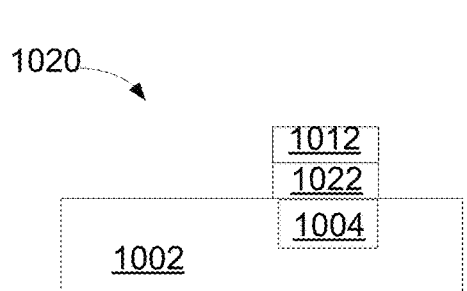
Figure 10D:
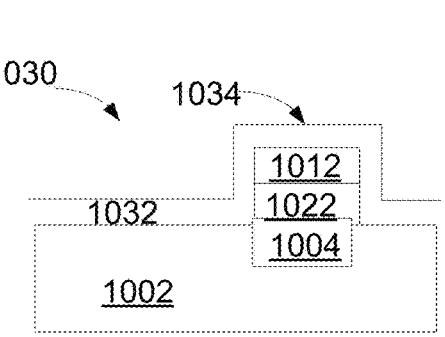

Another exemplary method includes forming or providing a structure, the structure having at least a magnetic writer on or in a substrate. Such an article is depicted in FIG. 10A. The article 1000 can include a substrate 1002 with a magnetic writer 1004 positioned therein or thereon. The next step can include depositing a first layer on the entire surface of the structure. The article depicted in FIG. 10A includes a first layer 1006 positioned on the entire surface of the substrate 1002 and writer 1004. The first layer 1006 can include a material that can provide protective properties, for example DLC. The next step can include removing a portion of the first layer over everything but the magnetic writer. The article 1010 depicted in FIG. 10B depicts one method of undertaking that step, by masking the portion of the first layer 1006 over the writer 1004 with a mask 1012. This can be accomplished using various photolithographic techniques. The mask 1012 can include materials such as photoresist, or alumina, for example. FIG. 10C depicts the article 1020 after the remainder of the first layer is removed leaving a portion of the first layer 1022 between the mask 1012 and the magnetic writer 1004. This step can be accomplished using various etching techniques. The next step can include depositing a second layer over the structure. An article after completion of this step is seen in FIG. 10D. The article 1030 can include the components seen above in FIG. 10C as well as a second layer 1032. The second layer 1032 can include a material that can provide protective properties, for example DLC. The second layer functions to form a variable overcoat layer that includes a disparate overcoat region 1034 and an overcoat layer (the remainder of the second layer 1032). The disparate overcoat region 1034 in this example can include the portion of the first layer 1022, the mask 1012 and the portion of the second layer 1032. It should also be noted that the mask 1012 could be removed before the second layer 1032 is deposited to create a disparate overcoat region that would include the portion of the first layer 1022 and the portion of the second layer 1032.

Figure 11A:
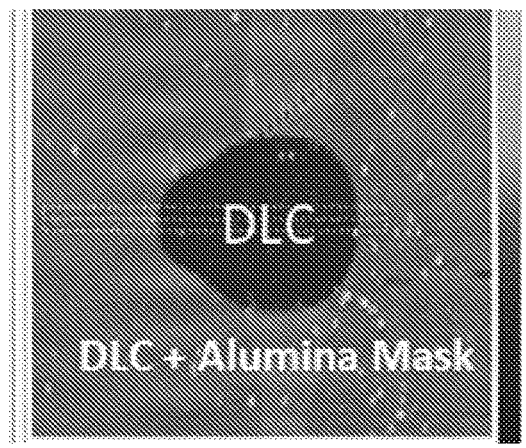
FIGS. 11A, 11B, and 11C are atomic force microscopy (AFM) images of an article at various stages of manufacture.
Figure 11B:
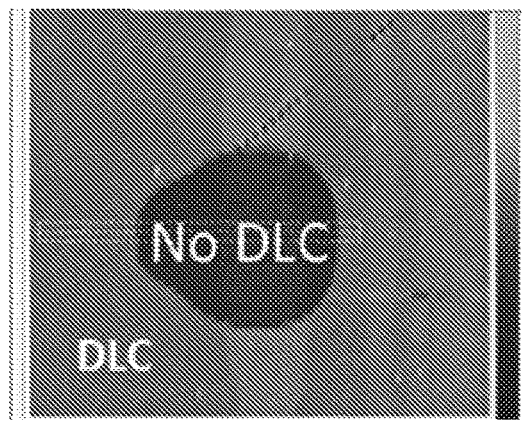
Figure 11C:
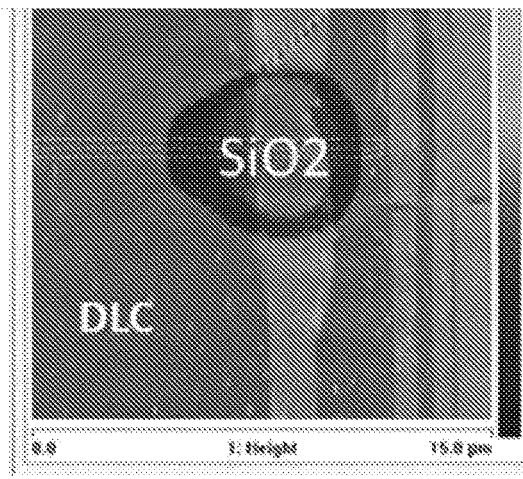

One specific exemplary method is as follows. The first step is to define the reader/writer/NFT dimensions and finish the ABS surface. This can be accomplished by kisslapping for example. Next, an overcoat, such as diamond like carbon (DLC) is deposited on the reader/writer/NFT. The DLC layer can be about 2 nm thick for example. Then, a hard mask is deposited on the DLC layer. An exemplary hard mask material includes alumina (Al$_2$O$_3$). Next, photo patterning techniques are utilized to protect the reader from the further processing meaning that the DLC layer already applied will ultimately be the hard mask layer over the reader. The effect of these steps is that a protective structure is built over the reader region leaving the writer/NFT region open for formation of additional layers. FIG. 11A shows an article at the point where the protective structure has been built over the reader but the DLC has not yet been etched off of the writer/NFT region. FIG. 11B shows the article immediately after the DLC layer has been removed from the writer/NFT region. Next, an alternative overcoat layer (the same material at a different thickness, a different material at the same thickness, or a different material at a different thickness) is deposited over the writer/NFT region. Once the alternative overcoat layer has been deposited, the protective structure over the reader region can then be removed. FIG. 11C shows the article after this step.

Figure 12:
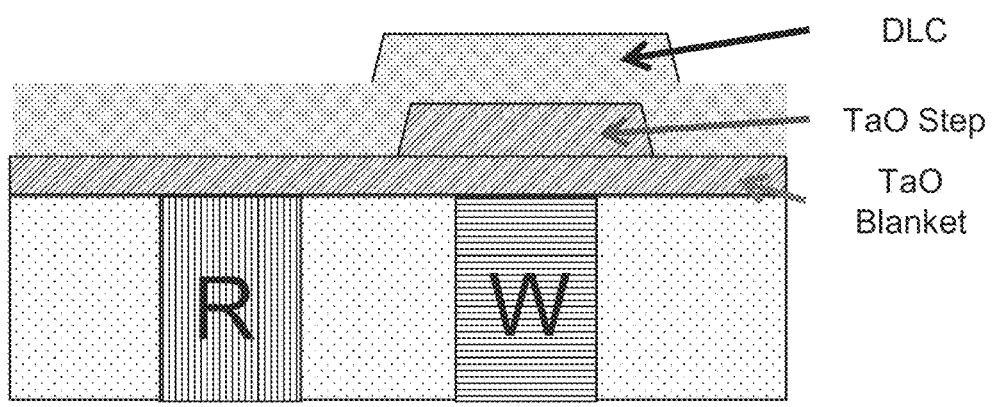
FIG. 12 is an illustration of an article that can be formed using various methods disclosed herein.

Another specific exemplary method is as follows. The device is blanketed with a layer of TaOx, for example. This TaOx layer can have a thickness from about 25 Å to about 75 Å. In some embodiments it can have a thickness from about 35 Å to about 60 Å. A device (completed) is shown in FIG. 12. The device in FIG. 12 includes the TaO blanket over both the reader (R) and the writer (W). Optionally, a DLC cap layer can be deposited over the TaO blanket (this is not shown in FIG. 12). The DLC cap layer, if present can have a thickness from about 5 Å to about 15 Å. In some embodiments, it can have a thickness of about 10 Å. Next, a protective structure is built over the writer/NFT region. This can be done using photo patterning techniques for example. In some embodiments, the protective structure can be a single layer resist that is a 60 µm×5 µm feature. Next, a portion of the TaO layer is etched away everywhere but where the protective structure is located. Then, the protective structure is removed. This results in a layer of TaOx over the writer that is thicker than the layer of TaOx over the reader. This can be seen in FIG. 12, where the TaO step is the thicker portion over the writer. After this, a blanket coating of DLC is applied over the entire structure. A finished article from this method is depicted in FIG. 12.

Thus, embodiments of magnetic devices including variable overcoat layers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A magnetic device having an air bearing surface, the magnetic device comprising:
   a magnetic reader;
   a magnetic writer; and
   a variable overcoat, the variable overcoat positioned over at least the magnetic reader and writer at the air bearing surface of the device, the variable overcoat comprising:
      an overcoat layer, the overcoat layer having a substantially constant thickness and material; and
      at least one disparate overcoat portion, the disparate overcoat portion positioned over the magnetic writer but not the magnetic reader, wherein the disparate overcoat portion has a greater thickness and a different material than the overcoat layer.

2. The magnetic device according to claim 1, wherein the disparate overcoat portion is about 50 Å thick and the overcoat layer is about 25 Å thick.

3. The magnetic device according to claim 1, wherein both the overcoat layer and the at least one disparate overcoat portion comprise diamond like carbon (DLC).

4. The magnetic device according to claim 3 wherein the disparate overcoat portion further comprises $TaO_x$.

5. A method comprising:
depositing a first layer over the entire air bearing surface of a structure, the structure comprising a magnetic reader and a magnetic writer, wherein the magnetic reader and the magnetic writer are positioned adjacent to each other on a substrate;
removing a portion of the first layer over at least the magnetic reader; and
depositing a second layer over the entire surface of the first layer,
wherein the first layer and the second layer comprise a variable overcoat, the variable overcoat having a overcoat layer and a disparate overcoat region over the magnetic writer, wherein the disparate overcoat region has a greater thickness than the overcoat layer, and wherein the first layer and the second layer comprise different materials.

6. The method according to claim 5, wherein the first layer comprises diamond like carbon (DLC).

7. The method according to claim 5 further comprising forming a protective structure over the magnetic writer before the portion of the first layer was removed.

8. A method comprising:
depositing a first layer on the entire air bearing surface of a structure, the structure comprising a magnetic reader and a magnetic writer, wherein the magnetic reader and the magnetic writer are positioned adjacent to each other on a substrate;
masking regions of the surface to form exposed and unexposed regions;
depositing a second layer on the surface of the exposed and unexposed regions; and
removing the unexposed regions and the second layer on the unexposed regions,
wherein a disparate overcoat region comprises a portion of the first layer and the second layer and the disparate overcoat region is positioned over the magnetic writer, and wherein the first layer and the second layer comprise different materials.

9. The method according to claim 8, wherein the first layer comprises diamond like carbon (DLC).

10. The method according to claim 8, wherein the second layer comprises TaOx.

11. The method according to claim 9, wherein the step of masking regions of the surface to form unexposed and exposed regions is accomplished using photolithography techniques.

12. The method according to claim 8, wherein the second layer has a thickness from about 40 Å to about 100 Å.

13. The method according to claim 10, wherein the second layer has a thickness of about 60 Å.

* * * * *